(12) United States Patent
McElroy et al.

(10) Patent No.: US 10,773,615 B2
(45) Date of Patent: Sep. 15, 2020

(54) VEHICLE SEATING ASSEMBLY WITH VENTILATED COOLING

(71) Applicant: Ford Global Technologies, LLC, Dearborn, MI (US)

(72) Inventors: Michael Murphy McElroy, South Lyon, MI (US); Jeffrey Michael Attala, Lasalle (CA); Josif Salanta, Ann Arbor, MI (US); Mukdam Kena, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 15/970,042

(22) Filed: May 3, 2018

(65) Prior Publication Data
US 2019/0337429 A1 Nov. 7, 2019

(51) Int. Cl.
*B60N 2/56* (2006.01)
*B60H 1/00* (2006.01)

(52) U.S. Cl.
CPC ....... *B60N 2/5642* (2013.01); *B60H 1/00285* (2013.01); *B60H 1/00564* (2013.01); *B60H 1/00864* (2013.01); *B60N 2/565* (2013.01); *B60N 2/5657* (2013.01)

(58) Field of Classification Search
CPC ... B60N 2/565; B60N 2/5635; B60H 1/00285
See application file for complete search history.

(56) References Cited

U.S. PATENT DOCUMENTS

| 6,145,925 | A | * | 11/2000 | Eksin | B60N 2/5635 |
| | | | | | 297/180.14 |
| 6,277,023 | B1 | * | 8/2001 | Schwarz | B60N 2/5635 |
| | | | | | 297/180.14 |
| 7,029,065 | B2 | | 4/2006 | Laib | |
| 2014/0179212 | A1 | * | 6/2014 | Space | B60N 2/565 |
| | | | | | 454/76 |
| 2015/0197136 | A1 | | 7/2015 | Chen et al. | |
| 2016/0347219 | A1 | * | 12/2016 | Akaike | B60N 2/5628 |
| 2019/0291614 | A1 | * | 9/2019 | Kawano | B60N 2/5678 |
| 2019/0366891 | A1 | * | 12/2019 | Bajic | B60N 2/5635 |

FOREIGN PATENT DOCUMENTS

| DE | 10319148 | B3 | * | 9/2004 | .......... B60N 2/5635 |
| DE | 102004024261 | B3 | * | 9/2005 | .......... B60N 2/5635 |
| DE | 102009043112 | A1 | * | 4/2010 | ............. B60H 1/246 |
| DE | 102009035776 | A1 | * | 2/2011 | .......... B60N 2/5671 |
| DE | 102013020924 | A1 | * | 7/2014 | .......... B60N 2/5685 |
| DE | 102015113142 | A1 | * | 2/2016 | ......... B60H 1/00478 |
| DE | 202018104917 | U1 | * | 9/2018 | .......... B60N 2/5635 |
| EP | 3480056 | A1 | * | 5/2019 | .......... B60N 2/5635 |

(Continued)

*Primary Examiner* — Timothy J Brindley
(74) *Attorney, Agent, or Firm* — David Coppiellie; Price Heneveld LLP

(57) ABSTRACT

A vehicle seat includes an air mover within a seatback. First and second inlet channels extend from an occupant seatback surface and a seatback lower portion, respectively, to the air mover. The air mover includes first and second outlet channels, and the air mover selectively and alternatively moves air from at least one of the first inlet channel to one of the first and second outlet channels or the second inlet channel to the first outlet channel.

20 Claims, 15 Drawing Sheets

(56) References Cited

FOREIGN PATENT DOCUMENTS

| FR | 2782953 A1 | 3/2000 | |
|---|---|---|---|
| JP | S62286824 A | 12/1987 | |
| WO | WO-2013178312 A1 * | 12/2013 | ............ B60N 2/565 |
| WO | WO-2014068840 A1 * | 5/2014 | ............ B60N 2/879 |
| WO | WO-2017040241 A1 * | 3/2017 | ............ B60N 2/879 |
| WO | WO-2017145630 A1 * | 8/2017 | ............ B60N 2/565 |

* cited by examiner

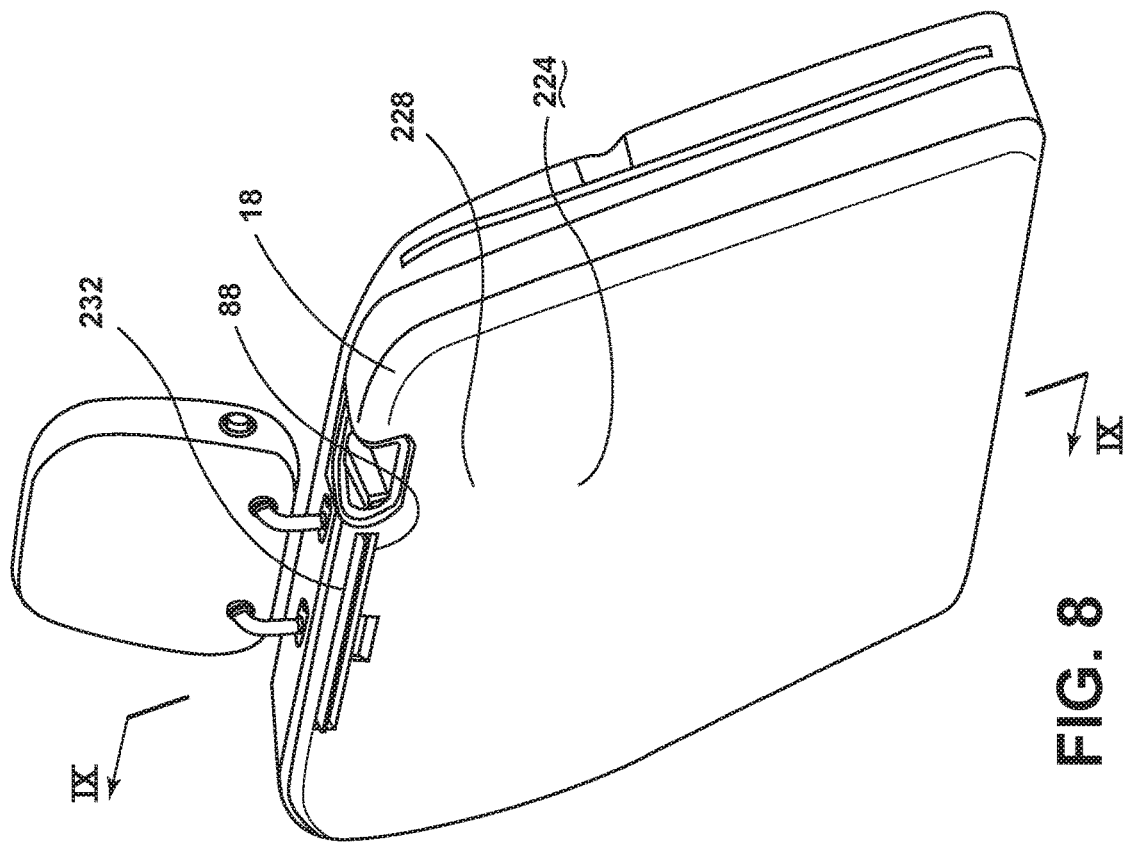
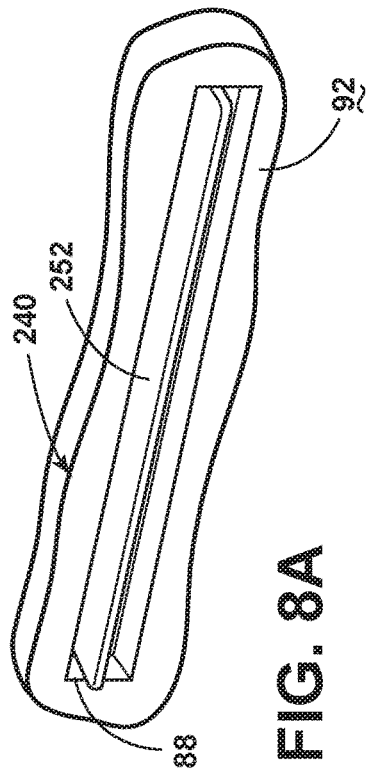
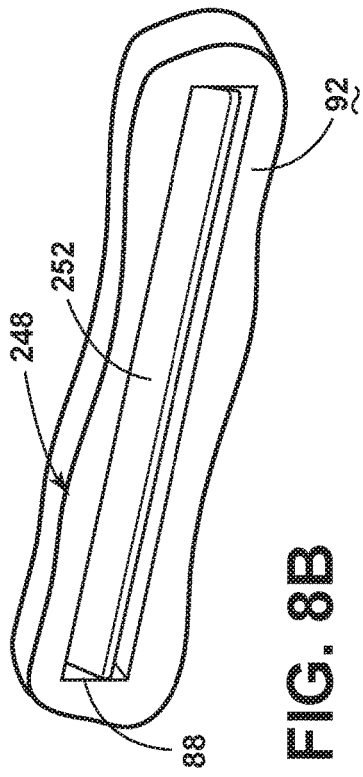
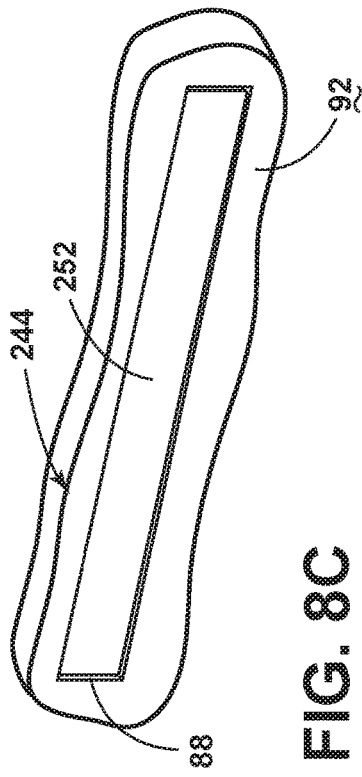
FIG. 8
FIG. 8A
FIG. 8B
FIG. 8C

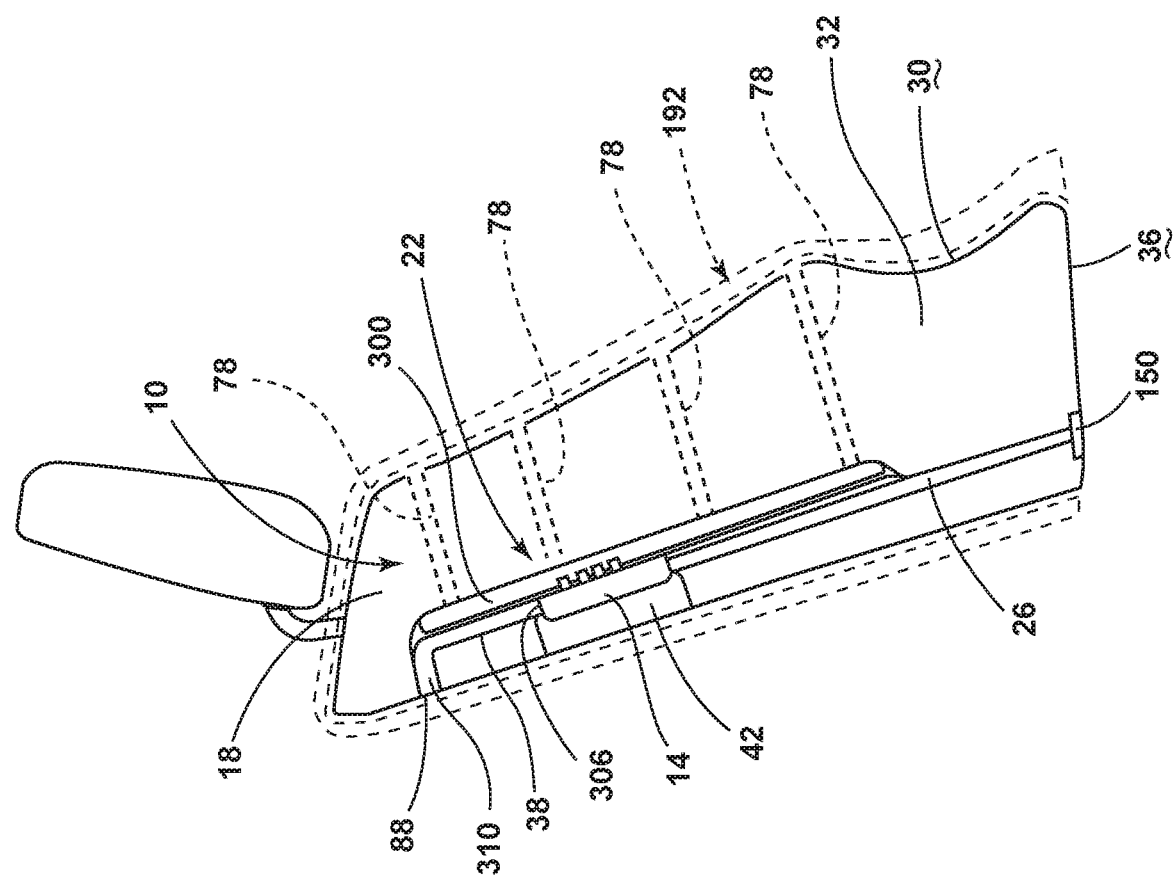

VEHICLE SEATING ASSEMBLY WITH VENTILATED COOLING

FIELD OF THE DISCLOSURE

The present disclosure generally relates to a vehicle seating assembly, and more particularly to a vehicle seating assembly that utilizes residual airflow from ventilated seat cooling to increase cabin airflow.

BACKGROUND OF THE DISCLOSURE

Vehicle seat comfort has become increasingly important as passengers take longer trips. Providing ventilation in the seating assembly can increase the comfort of passengers.

A variety of vehicle seating assemblies that provide for ventilated cooling of an occupant and a passenger are known. However, current solutions for providing cooling airflow often can be too bulky to conform to the seats for which they are intended while still efficiently ventilating the seats. It is desirable to provide a seating assembly that provides ventilated cooling to the occupant and the passenger.

SUMMARY OF THE DISCLOSURE

According to one aspect of the present disclosure, a vehicle seat includes an air mover within a seatback. First and second inlet channels extend from an occupant seatback surface and a seatback bottom, respectively, to the air mover. The air mover includes first and second outlet channels, and the air mover selectively and alternatively moves air from at least one of the first inlet channel to one of the first and second outlet channels or the second inlet channel to the first outlet channel.

Aspects of the first aspect of the disclosure can include any one or a combination of the following features:
- the first outlet channel of the air mover is selectively operable to exhaust air to a vent disposed on a rearward facing seatback surface and the second outlet channel of the air mover is selectively operable to exhaust air into a seatback interior;
- a first airflow adjuster for selectively blocking airflow from the first inlet channel to the air mover and a third airflow adjuster for selectively blocking airflow from the second inlet channel to the air mover;
- a second airflow adjuster proximate the air mover wherein the second airflow adjuster is selectively positionable to block the first outlet channel;
- a fourth airflow adjuster proximate the air mover wherein the fourth airflow adjuster is selectively positionable to block the second outlet channel;
- a first end of the first outlet channel is coupled to the air mover and a second end of the first outlet channel is coupled to the vent;
- the first inlet channel comprises a plurality of tubes extending from the occupant seatback surface to the air mover;
- a perforated trim disposed over the occupant seatback surface;
- the air mover draws air through the perforated trim, through the plurality of tubes, and to the air mover;
- the vent is selectively positionable in an open position, a closed position, and a plurality of positions between the open position and the closed position;
- an actuator;
- a controller, wherein the controller is in communication with the actuator, the air mover, the first airflow adjuster, the second airflow adjuster, the third airflow adjuster, and the fourth airflow adjuster, and wherein the controller is configured to provide an activation to the third airflow adjuster to block the second inlet channel to draw air from the occupant seatback surface towards the air mover through the first inlet channel in response to a first input from the actuator; provide an activation to the first airflow adjuster to block the first inlet channel to draw air from the seatback bottom surface towards the air mover through the second inlet channel in response to a second input from the actuator; provide an activation to the fourth airflow adjuster to block the second outlet channel to move air from the air mover towards the vent disposed on the rearward facing seatback surface through the first outlet channel in response to a third input from the actuator; and provide an activation to the second airflow adjuster to block the first outlet channel to move air from the air mover through the second outlet channel into the seat interior in response to a fourth input from the actuator; and/or
- the actuator includes an occupant actuator and a passenger actuator and wherein the occupant actuator is configured to override the passenger actuator.

According to another aspect of the present disclosure, a vehicle seating assembly includes a seatback having an occupant supporting surface and a rearward facing surface. An air mover is disposed in the seatback. An inlet channel extends from the occupant supporting surface to the air mover. An outlet channel extends from the air mover to the rearward facing surface. The air mover selectively moves air from the occupant supporting surface through a vent disposed on the rearward facing surface.

Aspects of the second aspect of the disclosure can include any one or a combination of the following features:
- the seatback comprises a bottom surface and wherein a selectively operable inlet duct extends from an inlet port disposed on the bottom surface to the air mover; and/or
- a selectively operable outlet on the air mover for releasing air into a seatback interior.

According to yet another aspect of the present disclosure, a seating assembly includes a seatback having an occupant supporting surface, a rearward facing surface, a bottom surface, and an interior space having an air mover. A first inlet channel moves air from the occupant supporting surface to the air mover. A second inlet channel moves air from the bottom surface to the air mover. A first outlet channel moves air from the air mover to the rearward facing surface. A second outlet channel releases air from the air mover into the interior space. A controller is configured to selectively and alternatively activate the first inlet channel and the second inlet channel. The controller is further configured to selectively and alternatively actuate the first and second outlet channels.

Aspects of the third aspect of the disclosure can include any one or a combination of the following features:
- the controller is configured to selectively activate the first inlet channel, the air mover, and the first outlet channel;
- the controller is configured to selectively activate the first inlet channel, the air mover, and the second outlet channel;
- the controller is configured to selectively activate the second inlet channel, the air mover, and the first outlet channel; and/or the controller is configured to selectively activate the second inlet channel, the air mover, and the second outlet channel.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a perspective view of a rearward facing surface of a seatback with an example of a potential vent design geometry according to an aspect of the present disclosure;

FIG. 8A is a perspective view of the vent of FIG. 8 in an open position;

FIG. 8B is a perspective view of the vent of FIG. 8 in an intermediate position between an open position and a closed position;

FIG. 8C is a perspective view of the vent of FIG. 8 in a closed position;

FIG. 9 is a cross-sectional view taken along line IX-IX of FIG. 8 according to an aspect of the present disclosure;

DETAILED DESCRIPTION

Figure 1:
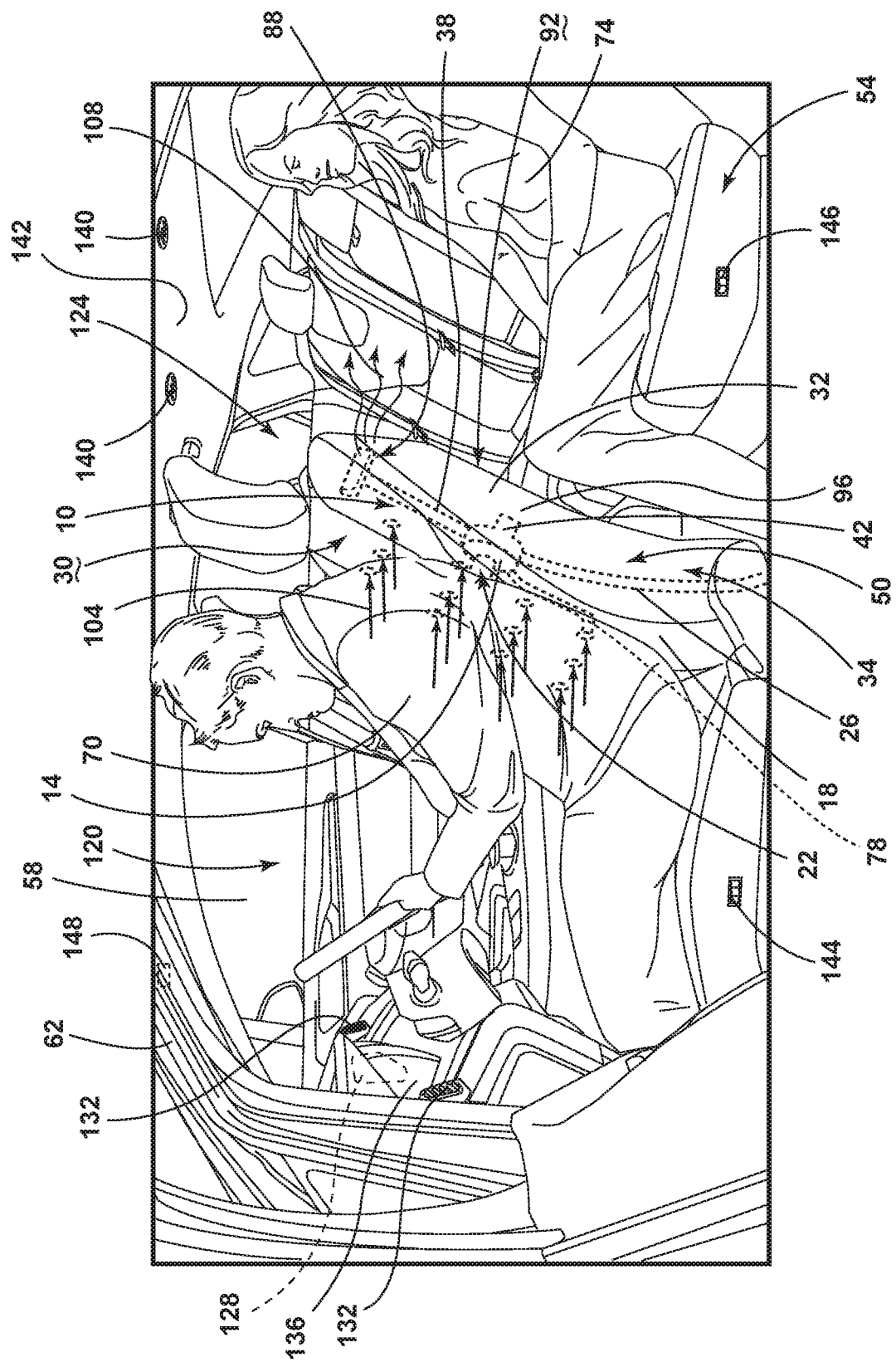
FIG. 1 is a side perspective view of an occupant environment with seating assemblies in a vehicle according to an aspect of the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-17, reference numeral 50 generally designates a vehicle seating assembly (seat) having an air mover 14 disposed within a seatback 18. The seating assembly 50 also includes first and second inlet channels 22, 26 extending from an occupant supporting seatback surface (occupant surface) 30 and a seatback lower portion 34, respectively, to the air mover 14. The air mover 14 includes first and second outlet channels 38, 42, and the air mover 14 selectively and alternatively moves air from at least one of the first inlet channel 22 to one of the first and second outlet channels 38, 42 or the second inlet channel 26 to the first outlet channel 38. In various aspects, seatback lower portion 34 includes seatback bottom surface 36.

With reference to FIG. 1, an occupant seating assembly 50 and a passenger seating assembly 54 are in a cabin 58 of a vehicle 62. The occupant seating assembly 50 includes a ventilating system 10 to cool an occupant 70 and/or a passenger 74. A plurality of tubes 78 extend from the occupant supporting seatback surface 30 (also referred to as the occupant supporting surface) to an air mover 14. The plurality of tubes 78 collectively form the first inlet channel 22 that delivers air shown by arrows 104 from the occupant supporting seatback surface 30 to the air mover 14. The first outlet channel 38 releases air from an air mover 14 to a vent 88 disposed on a rearward facing seatback surface 92 (also referred to as the rearward facing surface). Air shown by arrows 108 is released from the vent 88 towards the passenger 74. A selectively operable second inlet channel 26 extends from the seatback lower portion 34 to the air mover 14. A selectively operable second outlet channel 42 extends from the air mover 14 to a seatback interior 96.

Figure 1A:
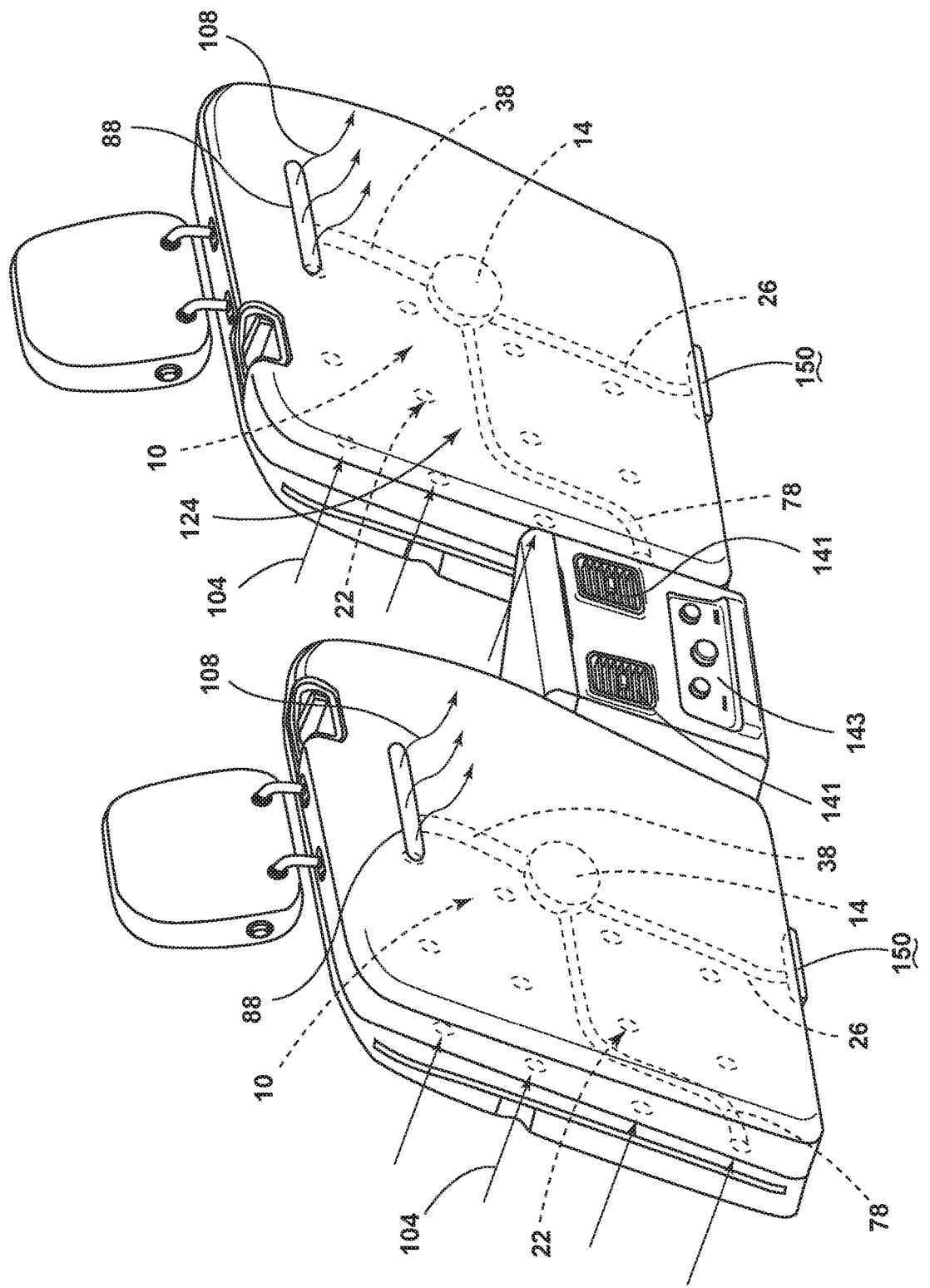
FIG. 1A is a side perspective view of a seating assembly in a vehicle according to an aspect of the present disclosure.

In certain conditions, when temperature and atmospheric conditions are outside of a comfort range for an occupant 70, the seating assembly 50 may be uncomfortably warm, such that the seating assembly 50 may not provide the occupant 70 with comfortable transit in a vehicle 62. The occupant 70 may desire a cooling airflow shown by arrows 104 to flow from the occupant supporting seatback surface 30, through the seatback pad 32, and to the air mover 14. Similarly, in certain conditions, when temperature and atmospheric conditions are outside of a comfort range for a passenger 74, the passenger 74 may be uncomfortably warm, such that the passenger 74 may desire a cooling airflow shown by arrows 108 to flow from a vent 88 disposed on the seating assembly 50 rearward facing seatback surface 92. In various aspects, a seatback ventilating system 10 may route ambient air or conditioned air from a front space 120 of the cabin 58 to a rear space 124 of the cabin 58. Routing of air from the front space 120 to the rear space 124 is beneficial when a vehicle air conditioning system 128 and vents 132 are located only in a front space 120 of a cabin 58. Typically, vents 132 in the front space 120 of the cabin 58 are in the instrument panel 136. Referring to FIGS. 1 and 1A, the ventilating system 10 may also be used to circulate cool air when air conditioning vents 132 are located in the front space 120 of the cabin 58 and additional air conditioning vents 140, 141 are located in a rear space 124 of the cabin 58 (for example, in a headliner 142 and/or a console 143). Also, the ventilating system 10 may be used to cool occupant 70 and passenger 74 when the air conditioning system 128 is not activated.

An occupant actuator 144, a passenger actuator 146, or a sensor 148 may activate the ventilating system 10. In the depicted aspect, the occupant actuator 144 is near the occupant seating assembly 50, and the passenger actuator 146 is near the passenger seating assembly 54. A sensor 148 may be located in a headliner 142 or other portion of the cabin 58.

Figure 3:
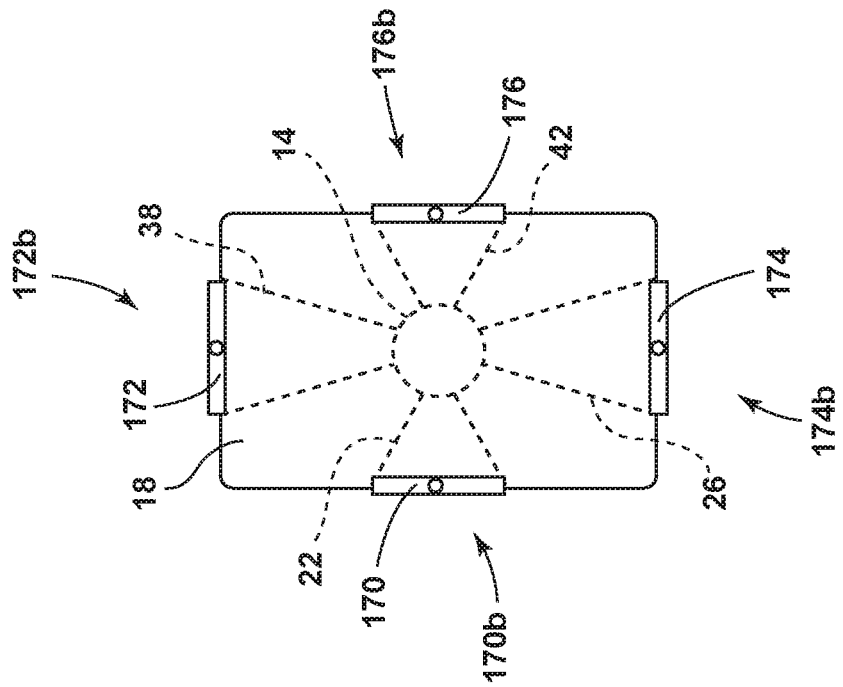
FIG. 3 is a seatback schematic showing the first airflow adjuster, the second airflow adjuster, the third airflow adjuster, and the fourth airflow adjuster in closed positions of an aspect of the present disclosure.
Figure 2:
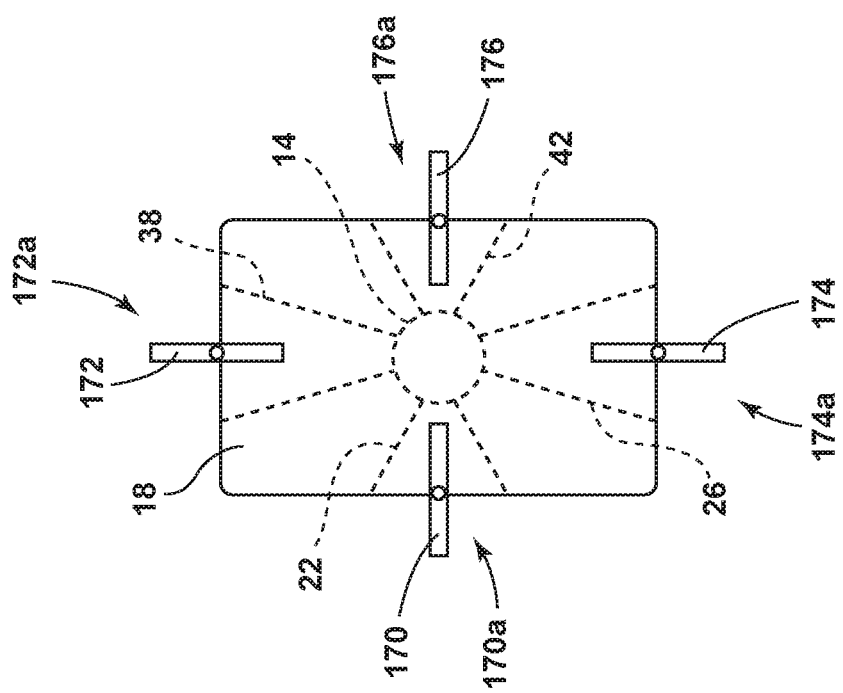
FIG. 2 is a seatback schematic showing the first airflow adjuster, the second airflow adjuster, the third airflow adjuster, and the fourth airflow adjuster in open positions of an aspect of the present disclosure.

Referring now to FIGS. 2-7, schematic diagrams show the ventilating system 10 within the seatback 18. FIGS. 2 and 3 are schematic representations of the first airflow adjuster 170, the second airflow adjuster 172, the third airflow adjuster 174, and the fourth airflow adjuster 176 in respective open positions 170a, 172a, 174a, and 176a (FIG. 2) and respective closed positions 170b, 172b, 174b, and 176b (FIG. 3). First airflow adjuster 170 is disposed at the first inlet channel 22. Second airflow adjuster 172 is disposed at the first outlet channel 38. Third airflow adjuster 174 is disposed at the second inlet channel 26. Fourth airflow adjuster 176 is disposed at the second outlet channel 42. First airflow adjuster 170, second airflow adjuster 172, third airflow adjuster 174, and fourth airflow adjuster 176 are selectively positionable in respective open positions 170a, 172a, 174a, and 176a to allow airflow to air mover 14 and respective closed positions 170b, 172b, 174b, and 176b to block airflow to air mover 14. First airflow adjuster 170, second airflow adjuster 172, third airflow adjuster 174, and fourth airflow adjuster 176 are also positionable in intermediary positions between open and closed positions.

Referring to FIGS. 4-7, a seating assembly 50 includes a seatback 18 having an occupant supporting seatback surface 30, a rearward facing seatback surface 92, a bottom surface 36, and a seatback interior 96. An air mover 14 is disposed within the seatback 18. The seatback 18 includes a first inlet channel 22 for moving air from the occupant supporting seatback surface 30 to the air mover 14, a second inlet channel 26 for moving air from the bottom surface 36 to the air mover 14, a first outlet channel 38 for moving air from the air mover 14 to the rearward facing seatback surface 92, and a second outlet channel 42 for releasing air from the air mover 14 into the seatback interior 96. Base 152 couples the seating assembly 50 to the floor 153.

Figure 4:
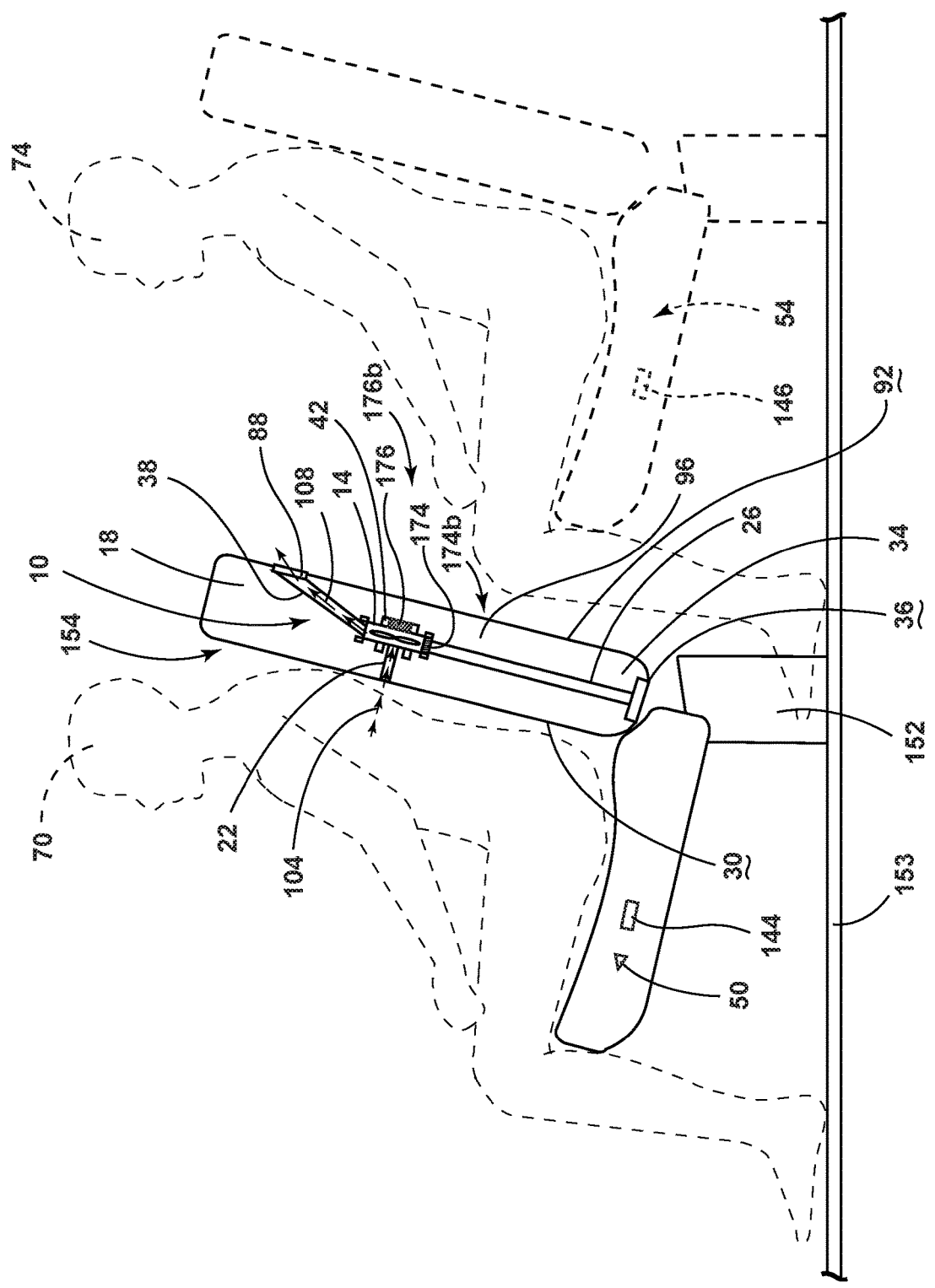
FIG. 4 is a seatback airflow schematic showing a first setting of a ventilating system with air entering a first inlet channel, moving through an air mover, and leaving a first outlet channel according to an aspect of the present disclosure.

FIG. 4 shows a schematic of the first setting 154 of the ventilating system 10. Air shown by arrows 104, 108 flows through the seatback 18 when the occupant 70 desires a cooling effect and the passenger 74 also desires a cooling effect. Air shown by arrows 104 flows from the occupant supporting seatback surface 30, through the first inlet channel 22, and into the air mover 14. The air shown by arrows 108 flows out of the air mover 14, out of the first outlet channel 38, and through the vent 88. The third airflow adjuster 174 is in the closed position 174b and prevents air from entering the air mover 14 from the second inlet channel 26. The fourth airflow adjuster 176 is in the closed position 176b to prevent air from leaving the air mover 14 through the second outlet channel 42. The first airflow adjuster 170 and the second airflow adjuster 172 are in respective open positions 170a and 172a (see FIG. 2, not shown in FIG. 4).

Figure 5:
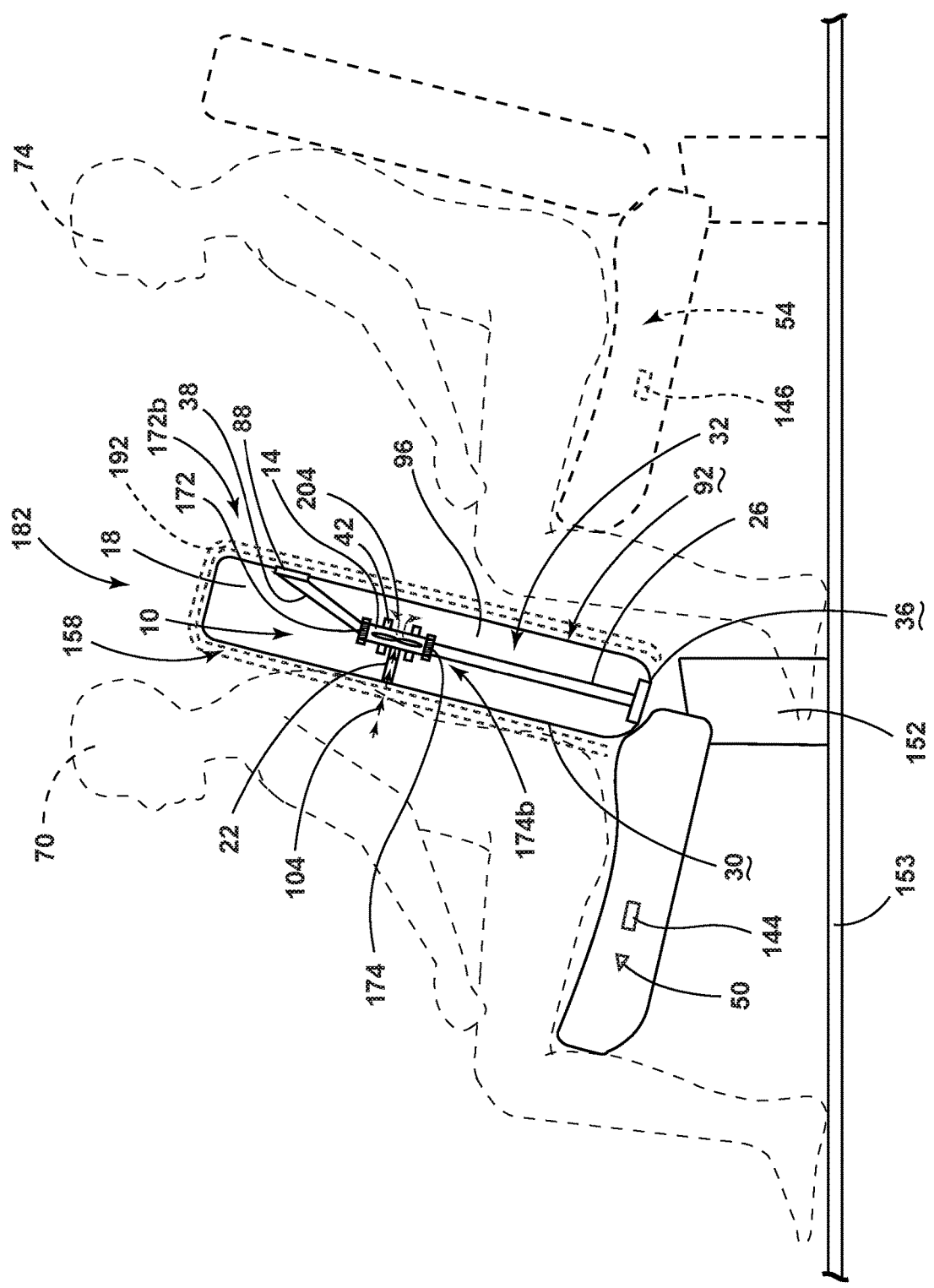
FIG. 5 is a seatback airflow schematic showing a second setting of a ventilating system with air entering a first inlet channel, moving through the air mover, and leaving a second outlet channel according to an aspect of the present disclosure.

FIG. 5 shows a schematic of the second setting 158 of the ventilating system 10. In the second setting 158, the occupant 70 desires a cooling effect, and the passenger 74 does not desire a cooling effect. Airflow shown by arrows 104 flows from the occupant supporting seatback surface 30 through the air mover 14, and airflow shown by arrows 204 flows out of the second outlet channel 42 into the seatback interior 96. The air shown by arrows 204 may leave the seatback interior 96 through a variety of egress points of the seatback interior 96. By way of example, in various aspects of the disclosure, the seatback pad 32 may be porous, and the air depicted by arrows 204 may be expelled through the pores of the seatback pad 32. In various aspects, the air depicted by arrows 204 may travel out of the seatback 18 through gaps between the seatback pad 32 and a perforated trim 192. The third airflow adjuster 174 is in the closed position 174b to prevent air from entering the air mover 14 from the second inlet channel 26. The second airflow adjuster 172 is in the closed position 172b to prevent air from leaving the first outlet channel 38. The first airflow adjuster 170 and the fourth airflow adjuster 176 are in respective open positions 170a and 176a (see FIG. 2, not shown in FIG. 5).

Figure 6:
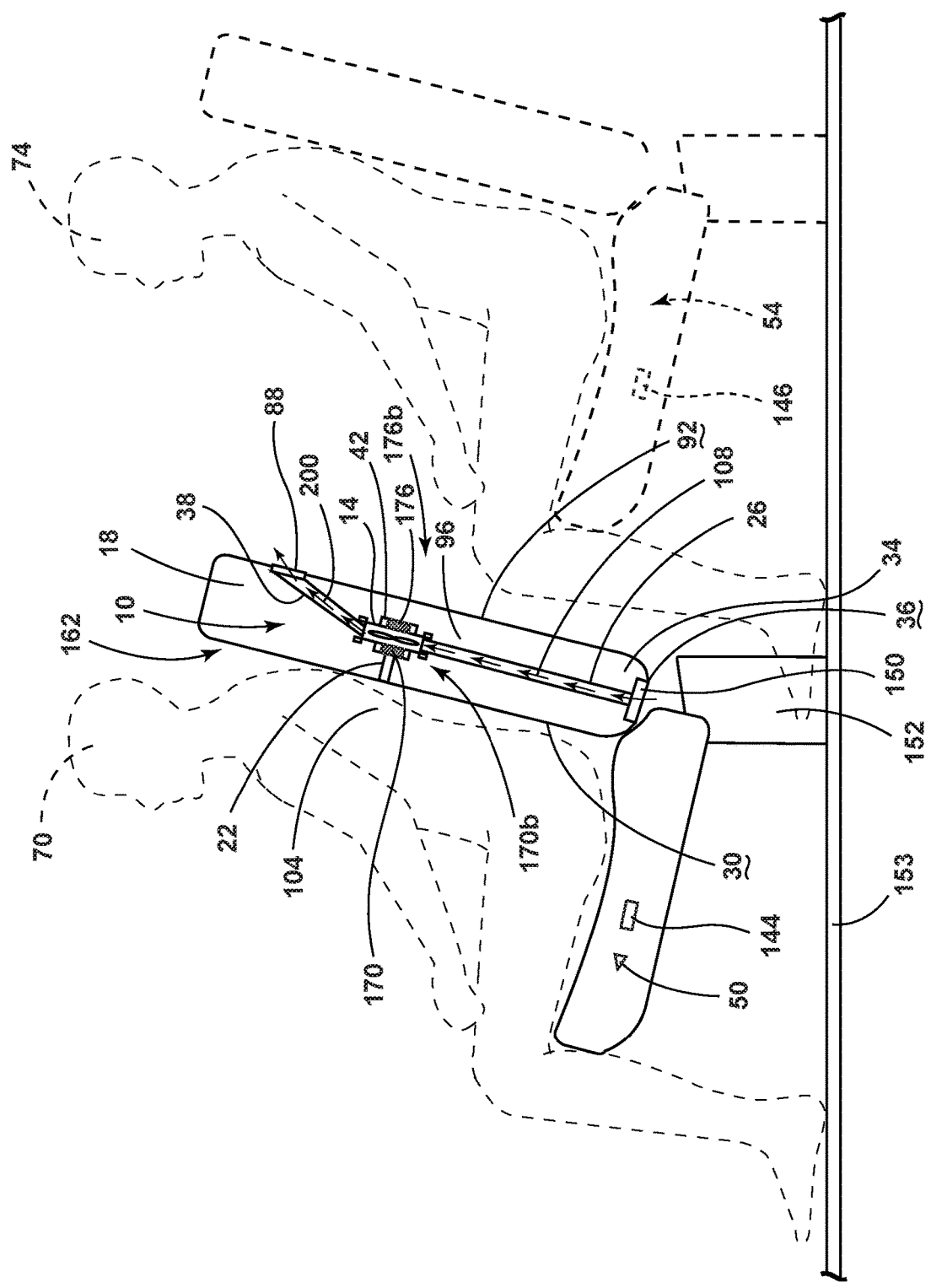
FIG. 6 is a seatback airflow schematic showing a third setting of a ventilating system with air entering a second inlet channel, moving through an air mover, and leaving a first outlet channel according to an aspect of the present disclosure.

FIG. 6 shows a schematic of the third setting 162 of the ventilating system 10. In the third setting 162, the occupant 70 does not desire a cooling effect, and the passenger 74 does desire a cooling effect. Airflow shown by arrows 108 flows into an inlet port 150 of the second inlet channel 26 at a seatback lower portion 34. The airflow shown by arrows 108 flows into the air mover 14 and out of the first outlet channel 38 and the vent 88 to cool the passenger 74. The first airflow adjuster 170 prevents air from entering the air mover 14 from the first inlet channel 22. The fourth airflow adjuster 176 is in the closed position 176b to prevent air from leaving the second outlet channel 42. The third airflow adjuster 174 and the second airflow adjuster 172 are in respective open positions 174a and 172a (see FIG. 2, not shown in FIG. 6).

Figure 7:
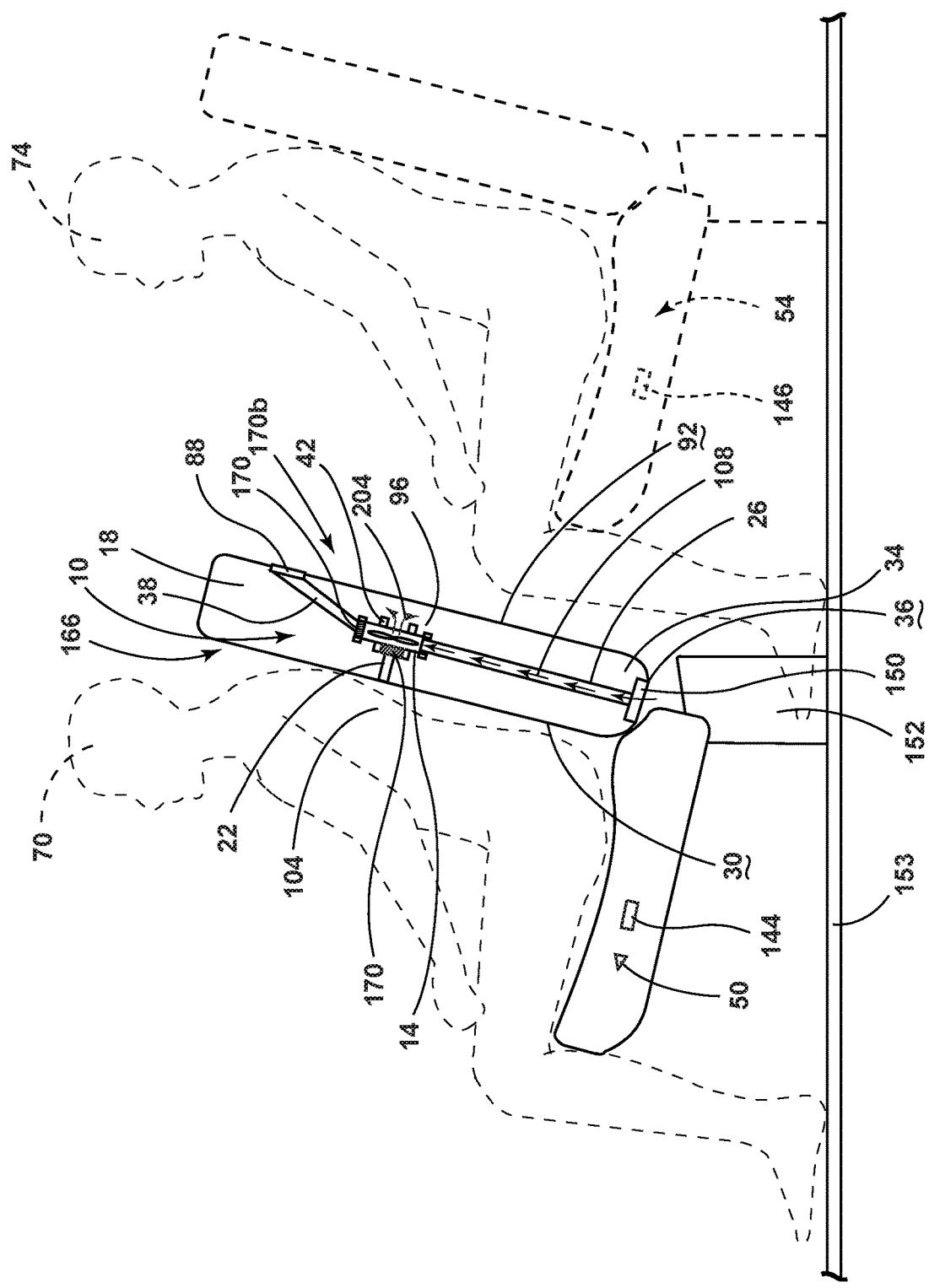
FIG. 7 is a seatback airflow schematic showing a fourth setting of a ventilating system with air entering a second inlet channel, moving through an air mover, and leaving a second outlet channel according to an aspect of the present disclosure.

FIG. 7 shows a schematic of the fourth setting 166 of the ventilating system 10. In the fourth setting 166, the occupant 70 does not desire a cooling effect, and the passenger 74 does not desire a cooling effect. The air shown by arrows 108 flows from the inlet port 150, through the second inlet channel 26, and into the air mover 14. Air shown by arrows 204 flows out of the second outlet channel 42 and into the seatback interior 96. The first airflow adjuster 170 prevents air from entering the air mover 14 from the first inlet channel 22. The second airflow adjuster 172 is in the closed position 172b to prevent air from leaving the first outlet channel 38.

The airflow shown by arrows 108, 204 may be desired to circulate air located near the seatback lower portion 34. This fourth setting 166 may be utilized for ventilation or air circulation functions within the passenger cabin 58. The third airflow adjuster 174 and the fourth airflow adjuster 176 are in respective open positions 174a and 176a (see FIG. 2, not shown in FIG. 7).

Referring to FIGS. 2-7, in various aspects, the second airflow adjuster 172 and the fourth airflow adjuster 176 may be in intermediate positions that may allow air to move from the air mover 14 into the first outlet channel 38 and the second outlet channel 42 simultaneously. In various aspects, the first airflow adjuster 170 and the third airflow adjuster 174 may be arranged in respective intermediate positions so that air from both the first inlet channel 22 and the second inlet channel 26 may flow to the air mover 14 simultaneously. In various aspects, the first airflow adjuster 170 may have a garage door configuration so that the first airflow adjuster 170 is rollable to cover an opening of the first inlet channel 22. In various aspects, the third airflow adjuster 174 may have a garage door type configuration so that the third airflow adjuster 174 is rollable to cover an opening of the second inlet channel 26. In various aspects of the device, the vent 88 may be utilized as the second airflow adjuster 172. In various aspects of the device, the vent 88 may take the form of one or more slots, a grille, louvers, or one or more adjustable slats.

Referring now to FIG. 8, an aspect of the seatback 18 is shown. The seatback 18 includes a vent 88 disposed on the rearward facing seatback surface 92 of an upper portion 228 of the seatback 18 and at an outlet port 232.

Referring to FIGS. 8A-8C, the vent 88 includes an adjustable slat 252. The adjustable slat 252 is selectively positionable in an open position 240 (FIG. 8A), a closed position 244 (FIG. 8C), and an intermediate position 248 between the open position 240 and the closed position 244 (FIG. 8B). The adjustable slat 252 is selectively positionable in a plurality of positions between an open position 240 and a closed position 244. In various aspects, the adjustable slat 252 in the form of a grille may be disposed at the outlet port 232, and airflow through the grille may be regulated by a mechanism that provides for no air flow, full air flow, or airflow in intermediate levels between no airflow and full airflow.

FIG. 9 shows a cross-sectional view of the seatback 18 of FIG. 8. The ventilating system 10 is disposed within the seatback 18. In the depicted aspect, a first inlet channel 22, which includes a plurality of tubes 78, is shown. In the depicted aspect, tubes 78 extend from the occupant supporting seatback surface 30 to a plenum 300 adjacent to the air mover 14. The second inlet channel 26, also sometimes referred to as the inlet duct, includes an inlet port 150 disposed on the bottom surface 36 of the seatback 18. The air mover 14 includes an exhaust duct, also referred to as a first outlet channel 38. A first end 306 of the first outlet channel 38 is coupled to the air mover 14. A second end 310 of the first outlet channel 38 is coupled to the vent 88. A second outlet channel 42 is disposed near the air mover 14. In various aspects of the disclosure, the seatback pad 32 may be a foam material, and the tubes 78 may be molded into the seatback pad 32. In various aspects, the tubes 78 may include separate plastic structures.

Referring again to FIG. 9, in various aspects, a perforated trim 192 may be disposed over seatback 18. When the perforated trim 192 is disposed over the seatback 18, the air mover 14 may draw air through the perforated trim 192 and the plurality of tubes 78.

Referring to FIGS. 10, 10A-10C, and 11, another aspect of the disclosure is generally shown. The seatback 18 includes a vent 88 disposed on a rearward facing seatback surface 92 on an upper portion 228 of the seatback 18 and at an outlet port 232.

Figure 10:
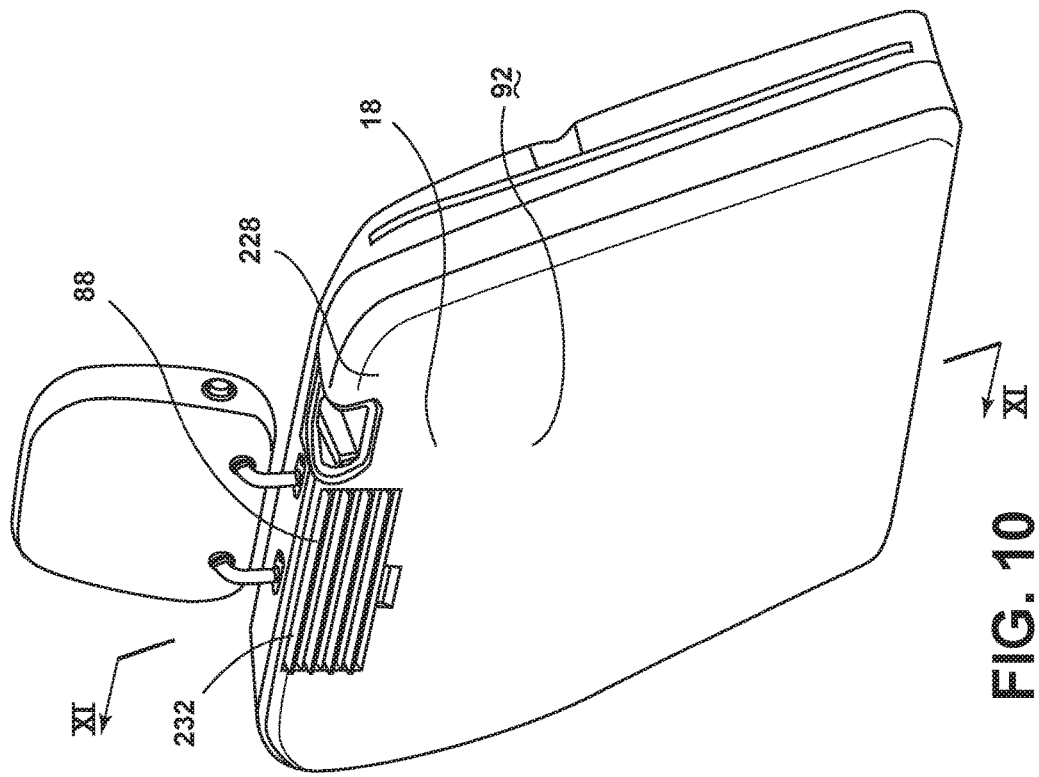
FIG. 10 is a perspective view of a rearward facing surface of a seatback with another example of a potential vent design geometry according to an aspect of the present disclosure.
Figure 10A:
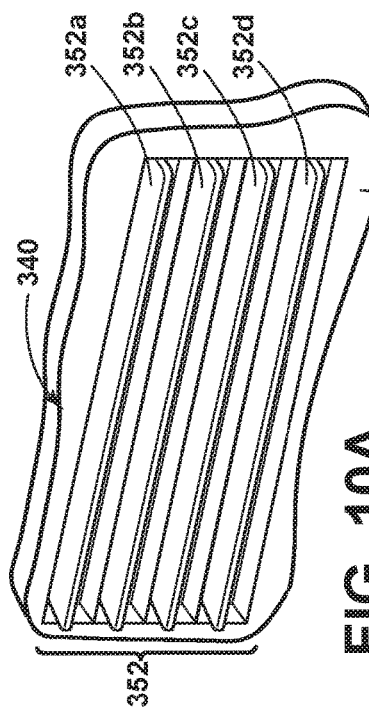
FIG. 10A is a perspective view of the vent of FIG. 10 in an open position.
Figure 10B:
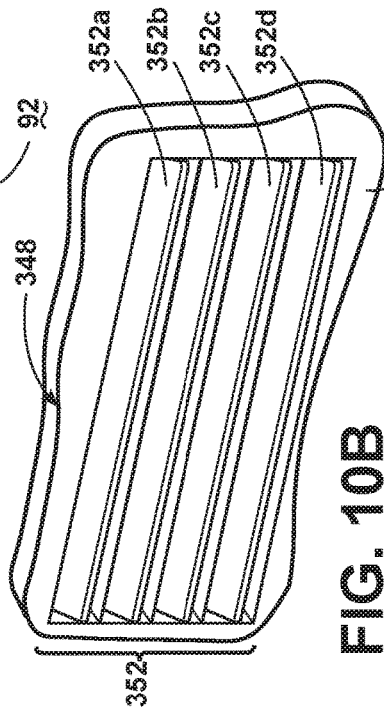
FIG. 10B is a perspective view of the vent of FIG. 10 in an intermediate position between an open position and a closed position.
Figure 10C:
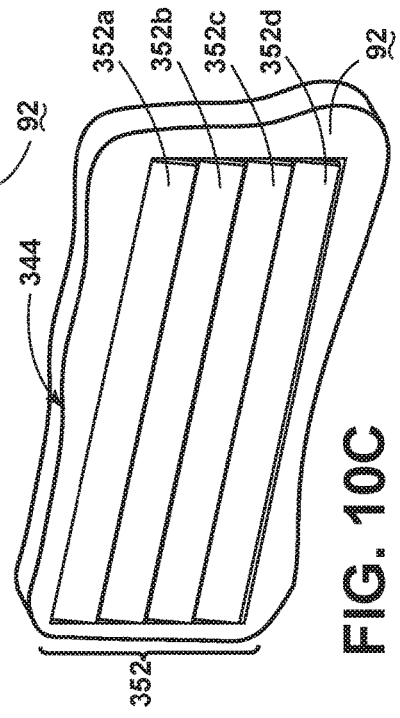
FIG. 10C is a perspective view of the vent of FIG. 10 in the closed position.

Referring to FIGS. 10A-10C, the vent 88 includes adjustable slats 352. Adjustable slats 352 include slats 352a, 352b, 352c, and 352d. Slats 352 are selectively positionable in an open position 340 (FIG. 10A), a closed position 344 (FIG. 10C), and an intermediate position 348 (FIG. 10B) between the open position 340 and the closed position 344. The adjustable slats 352a, 352b, 352c, and 352d are selectively positionable in a plurality of positions between an open position 340 and a closed position 344. In various aspects, the adjustable slats 352 in the form of a grille may be disposed at an outlet port 232, and airflow through the grille may be regulated by a mechanism that provides for no air flow, full air flow, or airflow in intermediate amounts between none and full.

Figure 11:
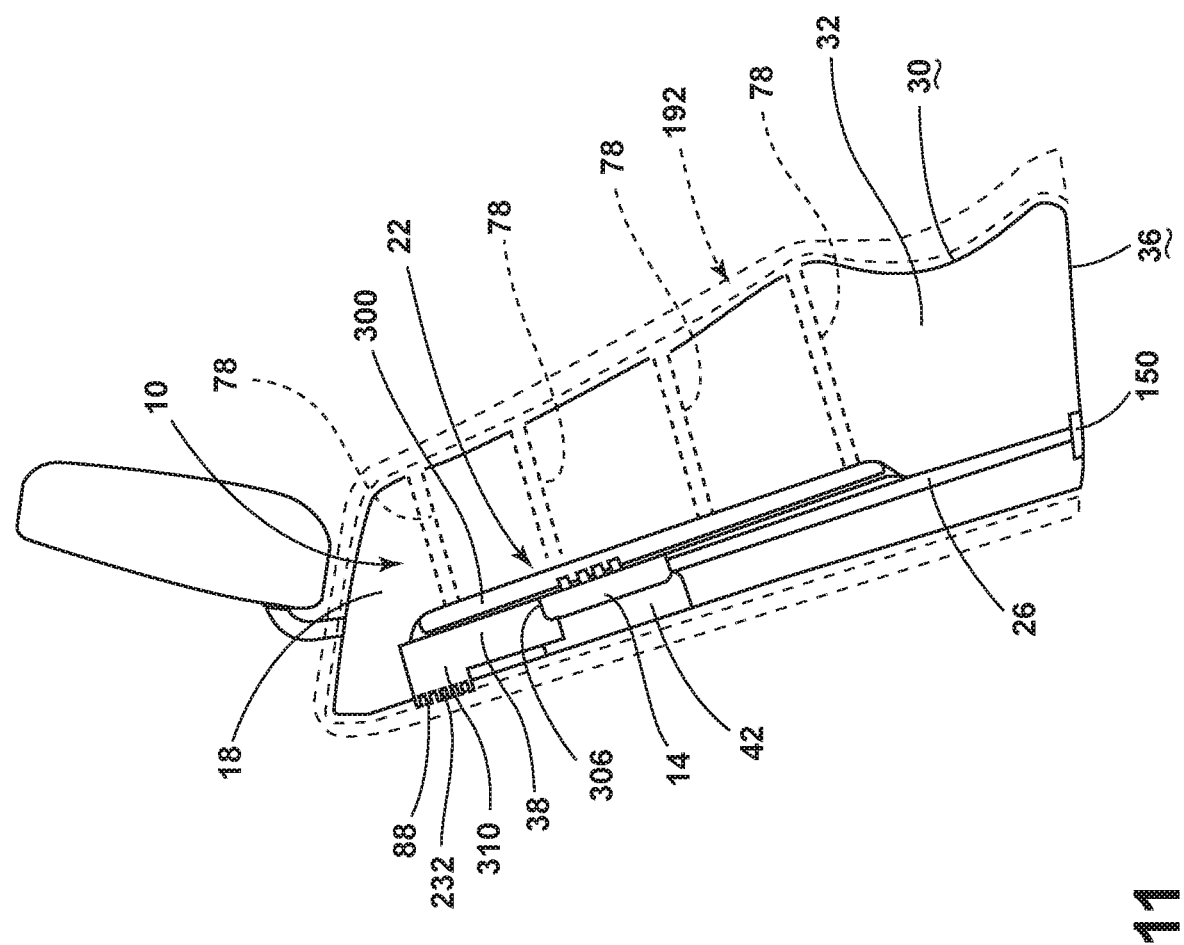
FIG. 11 is a cross-sectional view taken along line XI-XI of FIG. 10 according to an aspect of the present disclosure.

FIG. 11 shows a cross-sectional view of the seatback 18. The ventilating system 10 is disposed within the seatback 18. An air mover 14 includes an exhaust duct, also referred to as a first outlet channel 38. A first end 306 of the first outlet channel 38 is coupled to the air mover 14. A second end 310 of the first outlet channel 38 is coupled to the vent 88.

Figure 12:
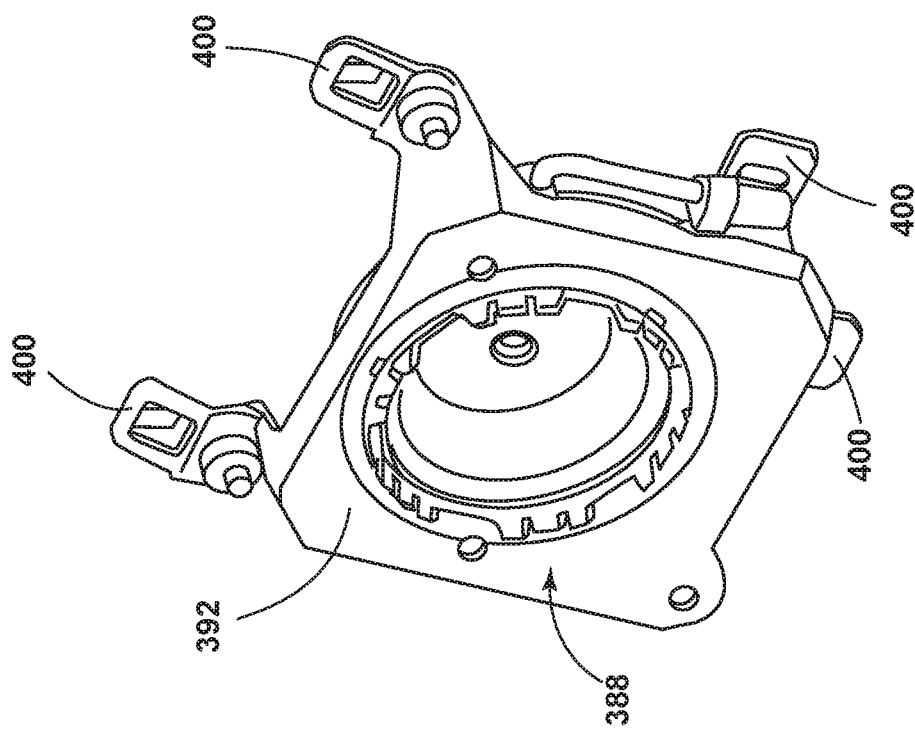
FIG. 12 is a front perspective view of an air mover according to an aspect of the present disclosure.
Figure 13:
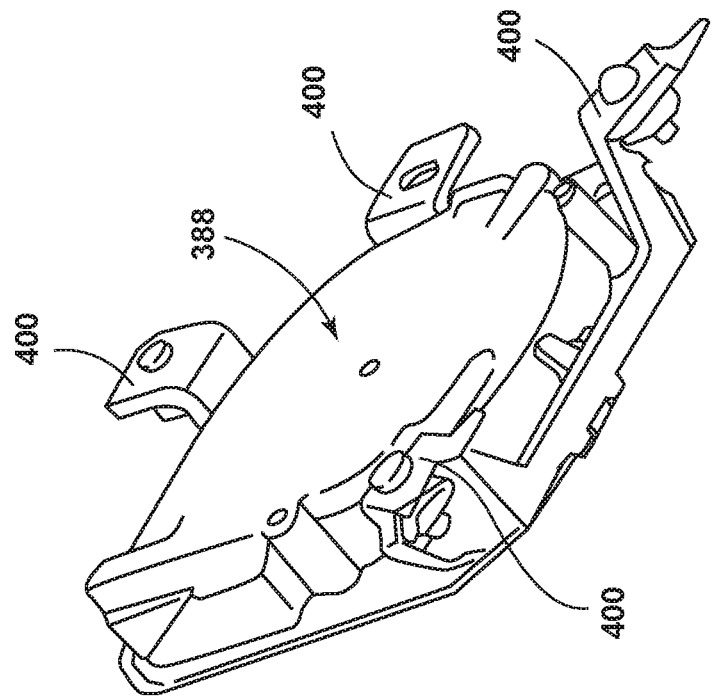
FIG. 13 is a rear perspective view of the air mover of FIG. 12.

Referring to FIGS. 12-15, an air mover 14 is shown. In the depicted aspect, the air mover 14 is a blower assembly. FIG. 12 is a front perspective view of the air mover 14. A front portion 392 of the air mover 14 is typically arranged to face the occupant supporting seatback surface 30, within a seatback 18. In various aspects, the blower structure of assembly 14 is mounted to a metal frame or other structure in the seatback 18. Mounting of the air mover 14 to the structure of seatback 18 can be achieved by various methods.

Figure 14:
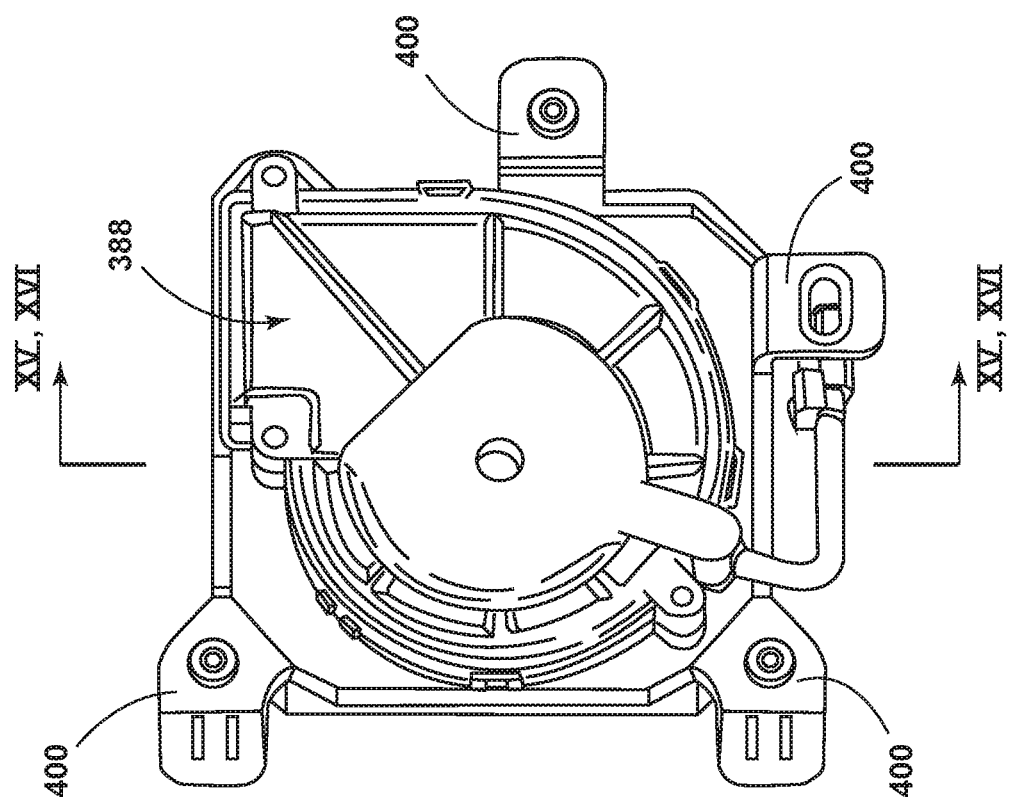
FIG. 14 is a plan view of the air mover of FIG. 12.
Figure 15:
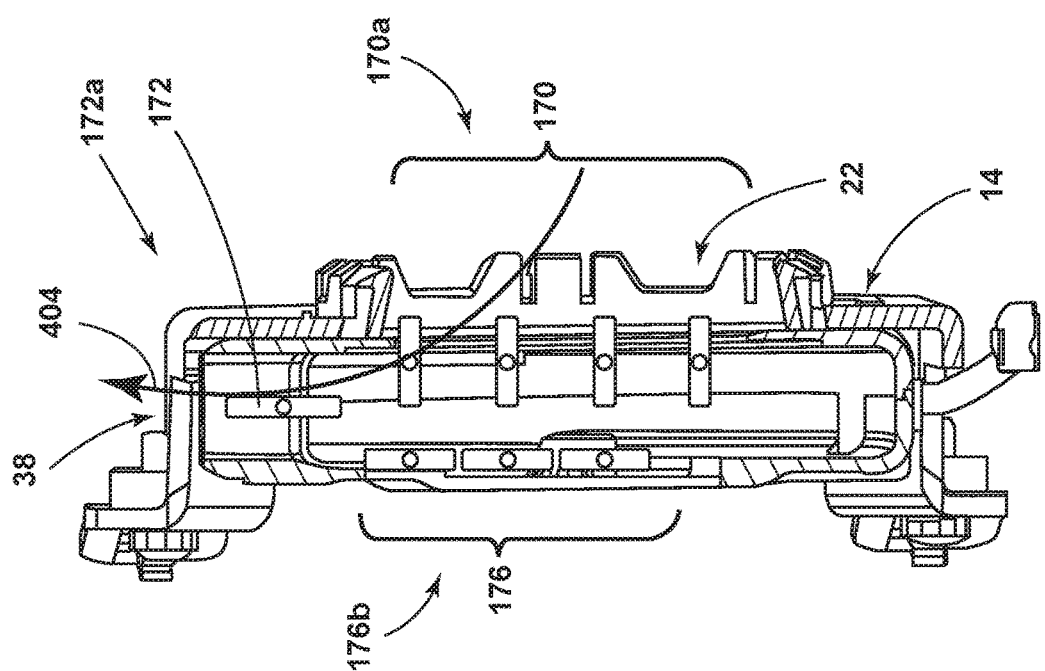
FIG. 15 is a cross-sectional view of the air mover of FIG. 14 taken along line XV-XV of FIG. 14 showing air entering a first inlet channel and leaving a first outlet channel of an aspect of the disclosure.

FIG. 15 is a cross-sectional view of the air mover 14 taken along line XV-XV of FIG. 14. FIG. 15 illustrates an airflow direction 404 into the air mover 14 from a first inlet channel 22, to a first outlet channel 38. In the shown aspect, the first airflow adjuster 170 includes a butterfly valve. The first airflow adjuster 170 is in an open position 170a. The second airflow adjuster 172 includes a butterfly valve. The second airflow adjuster 172 is in an open position 172a. The fourth airflow adjuster 176 includes a butterfly valve. The fourth airflow adjuster 176 is in the closed position 176b.

Figure 16:
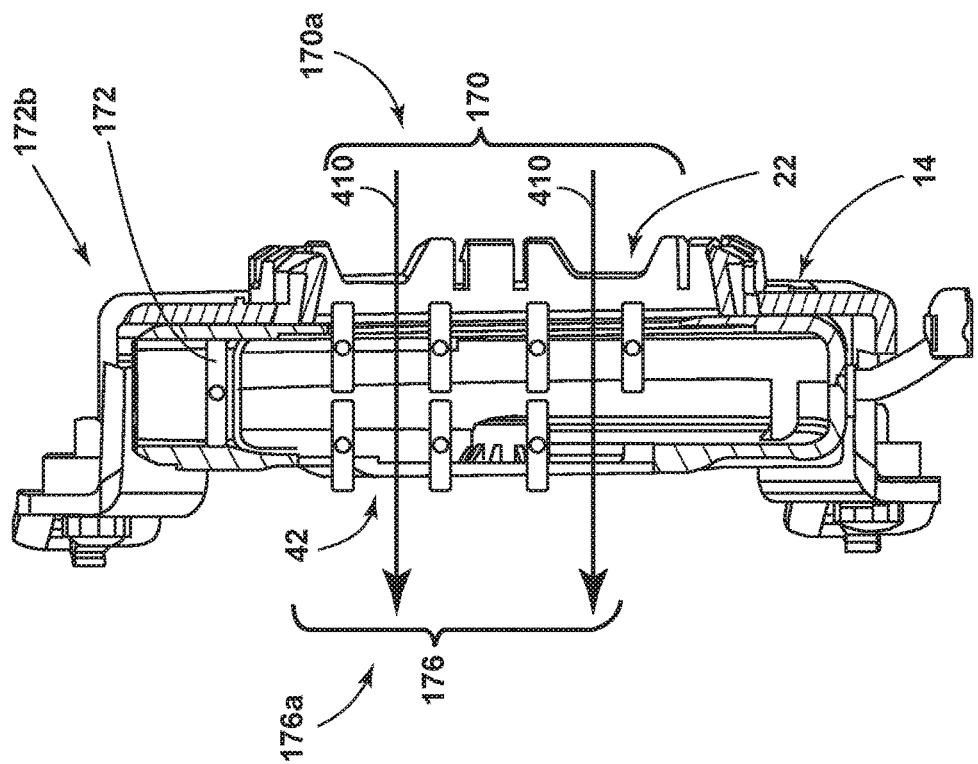
FIG. 16 is a cross-sectional view of the air mover of FIG. 14 taken along line XVI-XVI of FIG. 14 showing air entering a first inlet channel and leaving a second outlet channel of an aspect of the disclosure.

FIG. 16 is a cross-sectional view of the air mover 14 taken along line XVI-XVI of FIG. 14. FIG. 16 illustrates airflow direction 410 into the air mover 14 from a first inlet channel 22 to a second outlet channel 42. In the shown aspect, the first airflow adjuster 170 and the fourth airflow adjuster 176 are shown in respective open positions 170a, 176a. The second airflow adjuster 172 is shown in closed position 172b.

Figure 17:
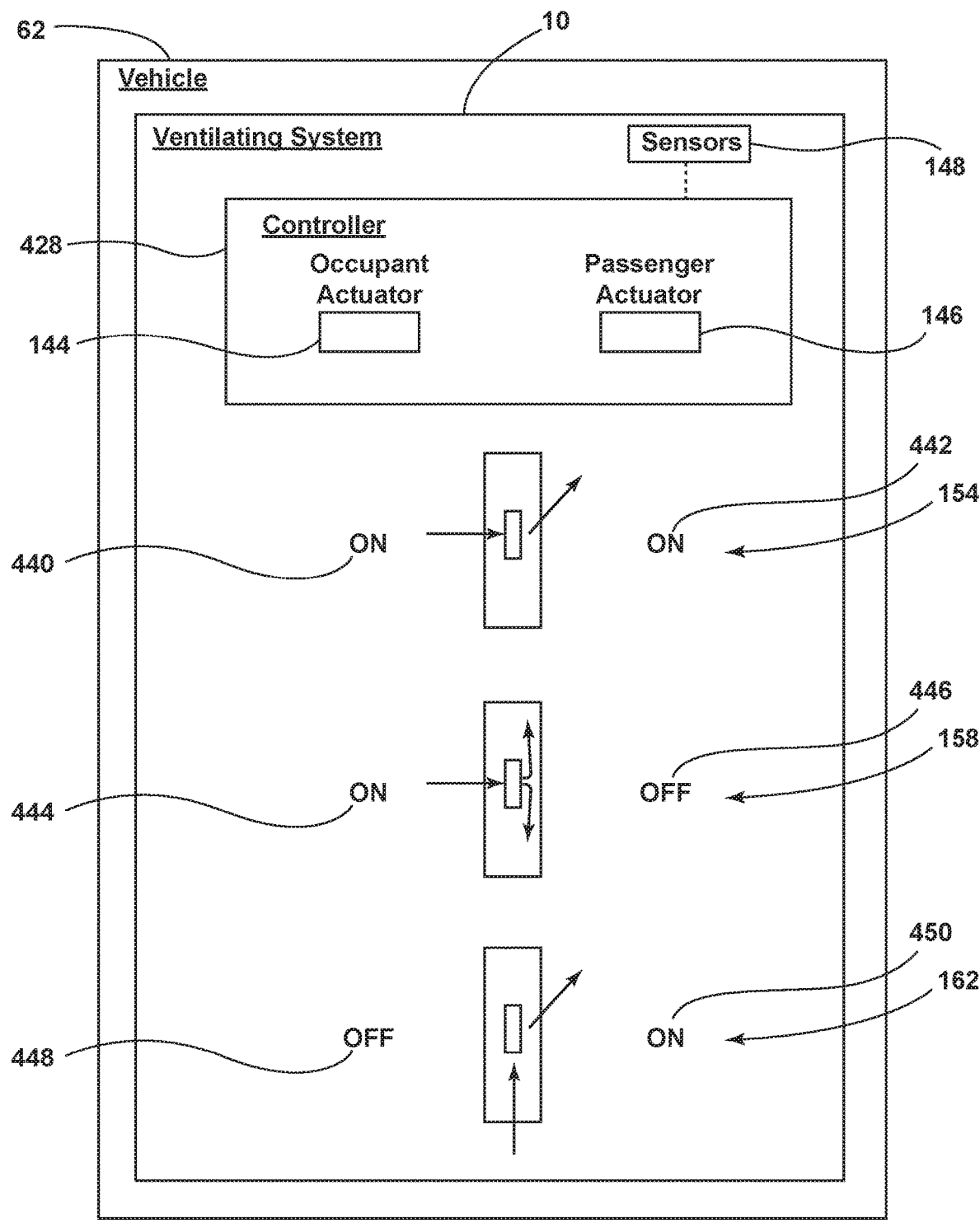
FIG. 17 is a schematic block diagram of the ventilating system in a first setting, a second setting, and a third setting according to an aspect of the present disclosure.

Referring now to FIG. 17, a block diagram of the vehicle 62 is shown including the seatback ventilating system 10. With reference to FIGS. 1-7 and 17, the occupant actuator 144, the passenger actuator 146, and the sensors 148 provide inputs to the controller 428. The occupant actuator 144 may be configured to override the passenger actuator 146. The sensors 148 may detect conditions within the vehicle 62 (e.g., cabin temperature, presence of occupant, presence of passenger, occupant facial temperature, passenger facial temperature). In response to information received from the occupant actuator 144, the passenger actuator 146, and/or the sensors 148, the controller 428 may activate the seatback ventilating system 10 in at least one of a first setting 154, a second setting 158, and a third setting 162.

Referring to FIGS. 4 and 17, in the first setting 154, air flows from the occupant supporting seatback surface 30 to the air mover 14, and the occupant actuator 144 is in an ON position 440. In the first setting 154, air flows from the air mover 14 to the first outlet channel 38, and the passenger actuator 146 is in an ON position 442. Cooling of the occupant 70 has been activated with the occupant actuator 144 in an ON position 440. Cooling of the passenger 74 has been activated with the passenger actuator 146 in an ON position 442.

Referring to FIGS. 5 and 17, in the second setting 158, air flows from the occupant supporting seatback surface 30 to the air mover 14, and the occupant actuator 144 is in an ON position 444. In the second setting 158, air flows from the air mover 14 to the second outlet channel 42, and the passenger actuator 146 is in an OFF position 446. Cooling of the occupant 70 has been activated with the occupant actuator 144 in an ON position 444. Cooling of the passenger 74 has not been activated with the passenger actuator 146 in an OFF position 446.

Referring to FIGS. 6 and 17, in the third setting 162, air flows from the seatback lower portion 34 to the air mover 14, and the occupant actuator 144 is in an OFF position 448. In the third setting 162, air flows from the air mover 14 to the first outlet channel 38, and the passenger actuator 146 is in an ON position 450. Cooling of the occupant 70 has not been activated with the occupant actuator 144 in an OFF position 448. Cooling of the passenger 74 has been activated with the passenger actuator 146 in an ON position 450.

With reference to FIG. 17, in various aspects, the ventilating system 10 of a seating assembly 50 may include an actuator (e.g., occupant actuator 144 or passenger actuator 146) and a controller 428. The controller 428 may be in communication with the actuator 144 or 146, the air mover 14, the first airflow adjuster 170, the third airflow adjuster 174, and the second airflow adjuster 172. The controller 428 may be configured to provide an activation to the third airflow adjuster 174 to block the second inlet channel 26 to draw air from the occupant supporting seatback surface 30 towards the air mover 14 through the first inlet channel 22 in response to a first input from the actuator 144 or 146. The controller 428 may be configured to provide an activation to the first airflow adjuster 170 to block the first inlet channel 22 to draw air from the seatback lower portion 34 towards the air mover 14 through the second inlet channel 26 in response to a second input from the actuator 144 or 146. The controller 428 may be configured to provide an activation to the fourth airflow adjuster 176 to block the second outlet channel 42 to move air from the air mover 14 towards the vent 88 disposed on the rearward facing seatback surface 92 through the first outlet channel 38 in response to a third input from the actuator 144 or 146. The controller 428 may be configured to provide an activation to the second airflow adjuster 172 to the closed position 172b to block the first outlet channel 38 to move air from the air mover 14 through the second outlet channel 42 into the seat interior 96 in response to a fourth input from the actuator. Other actuators may be included for additional features.

In various aspects of the disclosure, the ventilating system 10 may be located in any seat in the vehicle 62. In various aspects of the disclosure, the first inlet channel 22, the second inlet channel 26, and the first outlet channel 38, may extend from the air mover 14 to various seatback surfaces. In various aspects of the disclosure, additional inlet channels may be added to the ventilating system 10. In various aspects of the disclosure, additional outlet channels may be added to the ventilating system 10.

A variety of advantages may be derived from use of the present disclosure. Rear seat passenger comfort may be improved for relatively minor costs by adding ducting and a grille to an existing seatback having a blower with exhaust. The seatback ventilating system may be used to achieve environmentally sound vehicle conditions that minimize the use of power. Optional door shut offs for the grilles on the vents allow for selection of passive or directional airflow from the rearward facing seatback surface to the passenger.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seat comprising:
   an air mover within a seatback; and
   first and second inlet channels extending from an occupant seatback surface and a seatback lower portion, respectively, to the air mover, having first and second outlet channels, wherein the air mover selectively and alternatively moves air from at least one of the first inlet channel to one of the first and second outlet channels, or the second inlet channel to the first outlet channel, wherein the first outlet channel of the air mover is selectively operable to exhaust air to a vent disposed on a rearward facing seatback surface and the second outlet channel of the air mover is selectively operable to exhaust air into a seatback interior.

2. The vehicle seat of claim 1, further comprising a first airflow adjuster for selectively blocking airflow from the first inlet channel to the air mover and a third airflow adjuster for selectively blocking airflow from the second inlet channel to the air mover.

3. The vehicle seat of claim 2, further comprising:
   a second airflow adjuster proximate the air mover, wherein the second airflow adjuster is selectively positionable to block the first outlet channel.

4. The vehicle seat of claim 3, further comprising a fourth airflow adjuster proximate the air mover wherein the fourth airflow adjuster is selectively positionable to block the second outlet channel.

5. The vehicle seat of claim 4, wherein a first end of the first outlet channel is coupled to the air mover and a second end of the first outlet channel is coupled to the vent.

6. The vehicle seat of claim 5, wherein the first inlet channel comprises a plurality of tubes extending from the occupant seatback surface to the air mover.

7. The vehicle seat of claim 6, further comprising:
   a perforated trim disposed over the occupant seatback surface.

8. The vehicle seat of claim 7, wherein the air mover draws air through the perforated trim, through the plurality of tubes, and to the air mover.

9. The vehicle seat of claim 1, wherein the vent disposed on the rearward facing seatback surface is selectively positionable in an open position, a closed position, and a plurality of positions between an open position and a closed position.

10. The vehicle seat of claim 4, further comprising:
    an actuator; and
    a controller, wherein the controller is in communication with the actuator, the air mover, the first airflow adjuster, the second airflow adjuster, the third airflow adjuster, and the fourth airflow adjuster, and wherein the controller is configured to:

provide an activation to the third airflow adjuster to block the second inlet channel to draw air from the occupant seatback surface towards the air mover through the first inlet channel in response to a first input from the actuator;

provide an activation to the first airflow adjuster to block the first inlet channel to draw air from the seatback bottom surface towards the air mover through the second inlet channel in response to a second input from the actuator;

provide an activation to the fourth airflow adjuster to block the second outlet channel to move air from the air mover towards the vent disposed on the rearward facing seatback surface through the first outlet channel in response to a third input from the actuator; and provide an activation to the second airflow adjuster to block the first outlet channel to move air from the air mover through the second outlet channel into the seat interior in response to a fourth input from the actuator.

11. The vehicle seat of claim 10, wherein the actuator includes an occupant actuator and a passenger actuator and wherein the occupant actuator is configured to override the passenger actuator.

12. A vehicle seating assembly comprising:
a seatback including an occupant supporting surface and a rearward facing surface;
an air mover disposed in the seatback; and
an inlet channel extending from the occupant supporting surface to the air mover and an outlet channel extending from the air mover to the rearward facing surface, wherein the air mover selectively moves air from the occupant supporting surface through a vent disposed on the rearward facing surface, and further comprising a selectively operable outlet on the air mover for releasing air into a seatback interior.

13. The vehicle seating assembly of claim 12, wherein the seatback comprises a bottom surface and wherein a selectively operable inlet duct extends from an inlet port disposed on the bottom surface to the air mover.

14. The vehicle seating assembly of claim 12, wherein the air mover includes a butterfly valve.

15. The vehicle seating assembly of claim 12, wherein the selectively operable outlet includes a butterfly valve.

16. A seating assembly comprising:
a seatback comprising:
an occupant supporting surface,
a rearward facing surface,
a bottom surface, and
an interior space having an air mover;
a first inlet channel for moving air from the occupant supporting surface to the air mover;
a second inlet channel for moving air from the bottom surface to the air mover;
a first outlet channel for moving air from the air mover to the rearward facing surface;
a second outlet channel for releasing air from the air mover into the interior space; and
a controller configured to selectively and alternatively activate the first inlet channel and the second inlet channel, and wherein the controller is further configured to selectively and alternatively actuate the first and second outlet channels.

17. The seating assembly of claim 16, wherein the controller is configured to selectively activate the first inlet channel, the air mover, and the first outlet channel.

18. The seating assembly of claim 16, wherein the controller is configured to selectively activate the first inlet channel, the air mover, and the second outlet channel.

19. The seating assembly of claim 16, wherein the controller is configured to selectively activate the second inlet channel, the air mover, and the first outlet channel.

20. The seating assembly of claim 16, wherein the controller is configured to selectively activate the second inlet channel, the air mover, and the second outlet channel.

* * * * *